(12) United States Patent
Hsia

(10) Patent No.: US 11,800,616 B2
(45) Date of Patent: Oct. 24, 2023

(54) SOLID-STATE LIGHTING WITH DATA COMMUNICATION CONTROLS

(71) Applicant: Aleddra Inc., Renton, WA (US)

(72) Inventor: Chungho Hsia, Bellevue, WA (US)

(73) Assignee: Aleddra Inc., Renton, WA (US)

( * ) Notice: Subject to any disclaimer, the term of this patent is extended or adjusted under 35 U.S.C. 154(b) by 0 days.

(21) Appl. No.: 17/963,094

(22) Filed: Oct. 10, 2022

(65) Prior Publication Data

US 2023/0036179 A1 Feb. 2, 2023

Related U.S. Application Data

(63) Continuation-in-part of application No. 17/717,838, filed on Apr. 11, 2022, which is a continuation-in-part of application No. 17/696,780, filed on Mar. 16, 2022, which is a continuation-in-part of application No. 17/405,203, filed on Aug. 18, 2021, now Pat. No.
(Continued)

(51) Int. Cl.
*H05B 47/18* (2020.01)
*H05B 45/38* (2020.01)
*F21V 23/02* (2006.01)
*F21S 9/02* (2006.01)
(Continued)

(52) U.S. Cl.
CPC .............. *H05B 45/38* (2020.01); *F21S 9/02* (2013.01); *F21V 23/003* (2013.01); *F21V 23/02* (2013.01); *H05B 47/18* (2020.01); *F21Y 2115/10* (2016.08)

(58) Field of Classification Search
CPC .... H05B 45/38; H05B 45/3725; H05B 47/17; H05B 47/18; F21V 23/02; F21V 23/003; F21S 9/02; H02J 2207/20; H02J 7/02; H02J 7/00714; H02J 9/065; H02J 7/0071; F21Y 2115/10; H04L 67/12; H04L 63/1416; H04L 67/10; G06F 13/385; H01Q 1/22

USPC ........ 315/149; 370/352, 248, 493, 401, 412, 370/509, 241, 242

See application file for complete search history.

(56) References Cited

U.S. PATENT DOCUMENTS

| 8,508,148 B1 * | 8/2013 | Carley | H05B 47/19 439/620.02 |
| 8,773,030 B2 * | 7/2014 | Woytowitz | H05B 45/3725 315/210 |

(Continued)

*Primary Examiner* — Omar Rojas Cadima
(74) *Attorney, Agent, or Firm* — Han IP PLLC; Andy M. Han

(57) ABSTRACT

A light-emitting diode (LED) luminaire comprising a battery-backup portion is used to replace a luminaire operated only with alternate-current (AC) mains. The battery-backup portion comprises a rechargeable battery, a self-diagnostic circuit, and a front-end communication circuit. The self-diagnostic circuit comprises timers and is configured to provide test schedules and to auto-evaluate battery performance according to the test schedules with test results stored. The LED luminaire further comprises a remote user interface and a concentrator communication circuit configured to communicate with the front-end communication circuit configured to send the test results to the concentrator communication circuit as soon as a rechargeable battery test is performed. When the remote control signals are initiated by the remote user interface with spread-spectrum modulated signals transmitted, the front-end communication circuit can demodulate such signals and subsequently send commands to the self-diagnostic circuit to respond accordingly.

20 Claims, 4 Drawing Sheets

Related U.S. Application Data 11,283,291, which is a continuation-in-part of application No. 17/329,018, filed on May 24, 2021, now Pat. No. 11,303,151, which is a continuation-in-part of application No. 17/313,988, filed on May 6, 2021, now Pat. No. 11,264,831, which is a continuation-in-part of application No. 17/213,519, filed on Mar. 26, 2021, now Pat. No. 11,271,422, which is a continuation-in-part of application No. 17/151,606, filed on Jan. 18, 2021, now Pat. No. 11,259,386, which is a continuation-in-part of application No. 17/122,942, filed on Dec. 15, 2020, now Pat. No. 11,265,991, which is a continuation-in-part of application No. 17/099,450, filed on Nov. 16, 2020, now Pat. No. 11,264,830, which is a continuation-in-part of application No. 17/076,748, filed on Oct. 21, 2020, now Pat. No. 11,271,388, which is a continuation-in-part of application No. 17/026,903, filed on Sep. 21, 2020, now Pat. No. 11,271,421, which is a continuation-in-part of application No. 17/016,296, filed on Sep. 9, 2020, now Pat. No. 11,259,374, which is a continuation-in-part of application No. 16/989,016, filed on Aug. 10, 2020, now Pat. No. 11,122,658, which is a continuation-in-part of application No. 16/929,540, filed on Jul. 15, 2020, now Pat. No. 11,116,057, which is a continuation-in-part of application No. 16/904,206, filed on Jun. 17, 2020, now Pat. No. 11,102,864, which is a continuation-in-part of application No. 16/880,375, filed on May 21, 2020, now Pat. No. 11,172,551, which is a continuation-in-part of application No. 16/861,137, filed on Apr. 28, 2020, now Pat. No. 10,992,161, which is a continuation-in-part of application No. 16/830,198, filed on Mar. 25, 2020, now Pat. No. 10,869,373, which is a continuation-in-part of application No. 16/735,410, filed on Jan. 6, 2020, now Pat. No. 10,660,179, which is a continuation-in-part of application No. 16/694,970, filed on Nov. 25, 2019, now Pat. No. 10,602,597, which is a continuation-in-part of application No. 16/681,740, filed on Nov. 12, 2019, now Pat. No. 10,959,310, which is a continuation-in-part of application No. 16/664,034, filed on Oct. 25, 2019, now Pat. No. 10,660,184, which is a continuation-in-part of application No. 16/572,040, filed on Sep. 16, 2019, now Pat. No. 10,645,782, which is a continuation-in-part of application No. 16/547,502, filed on Aug. 21, 2019, now Pat. No. 10,485,073, which is a continuation-in-part of application No. 16/530,747, filed on Aug. 2, 2019, now Pat. No. 10,492,265, which is a continuation-in-part of application No. 16/458,823, filed on Jul. 1, 2019, now Pat. No. 10,485,065, which is a continuation-in-part of application No. 16/432,735, filed on Jun. 5, 2019, now Pat. No. 10,390,396, which is a continuation-in-part of application No. 16/401,849, filed on May 2, 2019, now Pat. No. 10,390,395, which is a continuation-in-part of application No. 16/296,864, filed on Mar. 8, 2019, now Pat. No. 10,390,394, which is a continuation-in-part of application No. 16/269,510, filed on Feb. 6, 2019, now Pat. No. 10,314,123, which is a continuation-in-part of application No. 16/247,456, filed on Jan. 14, 2019, now Pat. No. 10,327,298, which is a continuation-in-part of application No. 16/208,510, filed on Dec. 3, 2018, now Pat. No. 10,237,946, which is a continuation-in-part of application No. 16/154,707, filed on Oct. 8, 2018, now Pat. No. 10,225,905, which is a continuation-in-part of application No. 15/947,631, filed on Apr. 6, 2018, now Pat. No. 10,123,388, which is a continuation-in-part of application No. 15/911,086, filed on Mar. 3, 2018, now Pat. No. 10,136,483, which is a continuation-in-part of application No. 15/897,106, filed on Feb. 14, 2018, now Pat. No. 10,161,616, which is a continuation-in-part of application No. 15/874,752, filed on Jan. 18, 2018, now Pat. No. 10,036,515, which is a continuation-in-part of application No. 15/836,170, filed on Dec. 8, 2017, now Pat. No. 10,021,753, which is a continuation-in-part of application No. 15/649,392, filed on Jul. 13, 2017, now Pat. No. 9,986,619, which is a continuation-in-part of application No. 15/444,536, filed on Feb. 28, 2017, now Pat. No. 9,826,595, which is a continuation-in-part of application No. 15/362,772, filed on Nov. 28, 2016, now Pat. No. 9,967,927, which is a continuation-in-part of application No. 15/225,748, filed on Aug. 1, 2016, now Pat. No. 9,743,484, which is a continuation-in-part of application No. 14/818,041, filed on Aug. 4, 2015, now Pat. No. 9,420,663, which is a continuation-in-part of application No. 14/688,841, filed on Apr. 16, 2015, now Pat. No. 9,288,867, which is a continuation-in-part of application No. 14/465,174, filed on Aug. 21, 2014, now Pat. No. 9,277,603, which is a continuation-in-part of application No. 14/135,116, filed on Dec. 19, 2013, now Pat. No. 9,163,818, which is a continuation-in-part of application No. 13/525,249, filed on Jun. 15, 2012, now Pat. No. 8,749,167.

(51) Int. Cl.
*F21V 23/00* (2015.01)
*F21Y 115/10* (2016.01)

(56) References Cited

U.S. PATENT DOCUMENTS

| | | | |
|---|---|---|---|
| 9,667,096 B2 * | 5/2017 | Han | H02J 7/00714 |
| 2013/0127362 A1 * | 5/2013 | Trainor | H05B 45/10 |
| | | | 324/414 |

* cited by examiner

SOLID-STATE LIGHTING WITH DATA COMMUNICATION CONTROLS

CROSS-REFERENCE TO RELATED APPLICATIONS

The present disclosure is part of a continuation-in-part (CIP) application of U.S. patent application Ser. No. 17/717,838, filed 11 Apr. 2022, which is part of CIP application of U.S. patent application Ser. No. 17/405,203, filed 18 Aug. 2021 and issued as U.S. Pat. No. 11,283,291 on 22 Mar. 2022, which is part of CIP application of U.S. patent application Ser. No. 17/329,018, filed 24 May 2021 and issued as U.S. Pat. No. 11,303,151 on 12 Apr. 2022, which is part of CIP application of U.S. patent application Ser. No. 17/313,988, filed 6 May 2021 and issued as U.S. Pat. No. 11,264,831 on 1 Mar. 2022, which is part of CIP application of U.S. patent application Ser. No. 17/213,519, filed 26 Mar. 2021 and issued as U.S. Pat. No. 11,271,422 on 8 Mar. 2022, which is part of CIP application of U.S. patent application Ser. No. 17/151,606, filed 18 Jan. 2021 and issued as U.S. Pat. No. 11,259,386 on 22 Feb. 2022, which is part of CIP application of U.S. patent application Ser. No. 17/122,942, filed 15 Dec. 2020 and issued as U.S. Pat. No. 11,265,991 on 1 Mar. 2022, which is part of CIP application of U.S. patent application Ser. No. 17/099,450, filed 16 Nov. 2020 and issued as U.S. Pat. No. 11,264,830 on 1 Mar. 2022, which is part of CIP application of U.S. patent application Ser. No. 17/076,748, filed 21 Oct. 2020 and issued as U.S. Pat. No. 11,271,388 on 8 Mar. 2022, which is part of CIP application of U.S. patent application Ser. No. 17/026,903, filed 21 Sep. 2020 and issued as U.S. Pat. No. 11,271,421 on 8 Mar. 2022. Contents of the above-identified applications are incorporated herein by reference in their entirety.

BACKGROUND

Technical Field

The present disclosure relates to light-emitting diode (LED) luminaires and more particularly to an LED luminaire that includes a self-diagnostic circuit to auto-test a rechargeable battery according to test schedules provided by timers and to auto-communicate with a data gateway for delivering test results.

Description of the Related Art

Solid-state lighting from semiconductor LEDs has received much attention in general lighting applications today. Because of its potential for more energy savings, better environmental protection (with no hazardous materials used), higher efficiency, smaller size, and longer lifetime than conventional incandescent bulbs and fluorescent tubes, the LED-based solid-state lighting will be a mainstream for general lighting in the near future. Meanwhile, as LED technologies develop with the drive for energy efficiency and clean technologies worldwide, more families and organizations will adopt LED lighting for their illumination applications. In this trend, the potential safety concerns such as risk of electric shock and fire become especially important and need to be well addressed.

In today's retrofit applications of an LED luminaire to replace an existing fluorescent luminaire, consumers may choose either to adopt a ballast-compatible LED luminaire with an existing ballast used to operate the fluorescent luminaire or to employ an alternate-current (AC) mains-operable LED luminaire by removing/bypassing the ballast. Either application has its advantages and disadvantages. In the former case, although the ballast consumes extra power, it is straightforward to replace the fluorescent luminaire without rewiring, which consumers have a first impression that it is the best alternative. But the fact is that total cost of ownership for this approach is high regardless of very low initial cost. For example, the ballast-compatible LED luminaires work only with particular types of ballasts. If the existing ballast is not compatible with the ballast-compatible LED luminaire, the consumer will have to replace the ballast. Some facilities built long time ago incorporate different types of fixtures, which requires extensive labor for both identifying ballasts and replacing incompatible ones. Moreover, the ballast-compatible LED luminaire can operate longer than the ballast. When an old ballast fails, a new ballast will be needed to replace in order to keep the ballast-compatible LED luminaires working. Maintenance will be complicated, sometimes for the luminaires and sometimes for the ballasts. The incurred cost will preponderate over the initial cost savings by changeover to the ballast-compatible LED luminaires for hundreds of fixtures throughout a facility. In addition, replacing a failed ballast requires a certified electrician. The labor costs and long-term maintenance costs will be unacceptable to end users. From energy saving point of view, a ballast constantly draws power, even when the ballast-compatible LED luminaires are dead or not installed. In this sense, any energy saved while using the ballast-compatible LED luminaires becomes meaningless with the constant energy use by the ballast. In the long run, the ballast-compatible LED luminaires are more expensive and less efficient than self-sustaining AC mains-operable LED luminaires.

On the contrary, the AC mains-operable LED luminaire does not require a ballast to operate. Before use of the AC mains-operable LED luminaire, the ballast in a fixture must be removed or bypassed. Removing or bypassing the ballast does not require an electrician and can be replaced by end users. Each AC mains-operable LED luminaire is self-sustaining. Once installed, the AC mains-operable LED luminaires will only need to be replaced after 50,000 hours. In view of above advantages and disadvantages of both the ballast-compatible LED luminaires and the AC mains-operable LED luminaires, it seems that market needs a most cost-effective solution by using a universal LED luminaire that can be used with the AC mains and is compatible with a ballast so that LED luminaire users can save an initial cost by changeover to such an LED luminaire followed by retrofitting the luminaire fixture to be used with the AC mains when the ballast dies.

Furthermore, the AC mains-operable LED luminaires can easily be used with emergency lighting, which is especially important in this consumerism era. The emergency lighting systems in retail sales and assembly areas with an occupancy load of 100 or more are required by codes in many cities. Occupational Safety and Health Administration (OSHA) requires that a building's exit paths be properly and automatically lighted at least ninety minutes of illumination at a minimum of 10.8 lux so that an employee with normal vision can see along the exit route after the building power becomes unavailable. This means that emergency egress lighting must operate reliably and effectively during low visibility evacuations. To ensure reliability and effectiveness of backup lighting, building owners should abide by the National Fire Protection Association's (NFPA) emergency egress light requirements that emphasize performance, operation, power source, and testing. OSHA requires most commercial buildings to adhere to the NFPA standards or a significant fine. Meeting OSHA requirements takes time and investment, but not meeting them could result in fines and even prosecution. If a building has egress lighting problems that constitute code violations, the quickest way to fix is to replace existing luminaires with multi-function LED luminaires that have an emergency light package integrated with the normal lighting. The code also requires the emergency lights be periodically inspected and tested to ensure they are in proper working conditions at all times. It is, therefore, the manufacturers' responsibility to design an LED luminaire, an LED luminaire, or an LED lighting system with a self-diagnostic mechanism such that after the LED luminaire or the LED luminaire is installed on a ceiling or a high place in a room, the self-diagnostic mechanism can work with an emergency battery backup system to periodically auto-test charging and discharging current to meet regulatory requirements without safety issues. Furthermore, whereas the code also requires that written records documenting the testing be maintained and available for review by local fire departments, the market needs all of self-diagnostic test results over a period of time to be transmitted with an enough received signal strength into a data gateway to be recorded and managed without being lost or tampered. When a number of LED luminaires, each with a battery-backup power portion, are deployed in a wide area in a building or many buildings, a large amount of test data accumulated over time needs to auto-transmit to the data gateway using a more reliable data communication approach. In this disclosure, how to process and to wirelessly communicate the self-diagnostic test results in the LED luminaire are addressed.

SUMMARY

An LED luminaire comprising a normally operated portion and a battery-backup power portion is used to replace a luminaire operated only in a normal mode with the AC mains. The normally operated portion comprises a power supply portion that powers one or more LED arrays when a line voltage from the AC mains is available. The battery-backup power portion comprises a rechargeable battery with a terminal voltage, a control and test circuit, a front-end communication circuit, and an LED driving circuit configured to receive power from the rechargeable battery and to generate a voltage operating the one or more LED arrays when the line voltage from the AC mains is unavailable. The control and test circuit comprises a self-diagnostic circuit and a charging detection and control circuit. The control and test circuit is configured to either enable or disable the LED driving circuit and the power supply portion according to availability of the AC mains and whether a rechargeable battery test is initiated. The charging detection and control circuit comprises a first transistor circuit configured to detect a charging voltage.

The power supply portion comprises at least two electrical conductors configured to receive an input AC voltage, a main full-wave rectifier, and an input filter. The at least two electrical conductors are configured to couple to the battery-backup power portion. The main full-wave rectifier is coupled to the at least two electrical conductors and configured to convert the input AC voltage into a primary direct-current (DC) voltage. The input filter is configured to suppress electromagnetic interference (EMI) noises. The power supply portion further comprises a power switching converter comprising a main transformer and a power factor correction (PFC) and power switching circuit. The PFC and power switching circuit is coupled to the main full-wave rectifier via the input filter and configured to improve a power factor and to convert the primary DC voltage into a main DC voltage with a first LED driving current. The main DC voltage with the first LED driving current is configured to couple to the one or more LED arrays to operate thereof.

The battery-backup power portion further comprises at least one full-wave rectifier and a charging circuit. The at least one full-wave rectifier is coupled to the AC mains and configured to convert the line voltage from the AC mains into a first DC voltage. The charging circuit comprises a charging control device, a first transformer, a first ground reference, and a second ground reference electrically isolated from the first ground reference. The charging circuit is coupled to the at least one full-wave rectifier and configured to convert the first DC voltage into a second DC voltage that charges the rechargeable battery to reach a nominal third DC voltage. The charging circuit is configured to monitor the second DC voltage and to regulate the charging control device in response to various charging requirements. The LED driving circuit is configured to convert the terminal voltage of the rechargeable battery into a fourth DC voltage with a second LED driving current to drive the one or more LED arrays when the line voltage from the AC mains is unavailable.

The self-diagnostic circuit comprises a plurality of timers configured to set up test schedules and to allow the self-diagnostic circuit to control discharging of the rechargeable battery and to perform the rechargeable battery test according to the test schedules. The test schedules comprise at least one first time delay and at least one second time delay. The at least one first time delay comprises a nominal wait duration of 30 days whereas the at least one second time delay comprises a nominal test duration of either 90 minutes or 30 seconds. Specifically, the plurality of timers start with a reset. The test schedules comprise a first kind of the test event and a second kind of the test event respectively at an end of each month and at an end of each year after the reset.

The charging detection and control circuit further comprises a peripheral circuit. The peripheral circuit is configured to sample a fraction of the terminal voltage of the rechargeable battery and to deliver to the self-diagnostic circuit to examine over the test duration when the rechargeable battery test is initiated by the plurality of timers. The self-diagnostic circuit is configured to perform a pass/fail test. When the terminal voltage drops below a predetermined level over the duration of the test period, the test portion assesses the rechargeable battery test as a "failure", a "no-go", a "no", or a "1". The charging detection and control circuit further comprises at least one status indicator configured to show self-diagnostic test results.

The charging detection and control circuit is coupled between the charging circuit and the rechargeable battery and controlled by the self-diagnostic circuit. When the first transistor circuit detects the charging voltage, a pull-down signal is sent to the self-diagnostic circuit to enable a normal charging process. The charging detection and control circuit further comprises a charging control circuit configured to either allow or prohibit a charging current to flow into the rechargeable battery according to availability of the AC mains. The charging control circuit prohibits the charging current to flow into the rechargeable battery when the rechargeable battery test is initiated. The charging control circuit comprises a second transistor circuit and a metal-oxide-semiconductor field-effect transistor (MOSFET). The second transistor circuit is configured to receive a high-level signal equal to a nominal operating voltage of the self-diagnostic circuit therefrom to pull down a bias voltage of the MOSFET, thereby disconnecting the charging current when the rechargeable battery test is initiated.

The charging detection and control circuit further comprises at least one pair of electrical contacts configured to electrically couple the rechargeable battery to the charging circuit, the LED driving circuit, and the self-diagnostic circuit to operate thereof when the rechargeable battery test is initiated or when the line voltage from the AC mains is not available. When disconnected, the at least one pair of electrical contacts can prevent the rechargeable battery from being drained. The at least one pair of electrical contacts comprise electrical contacts in a switch, a relay, and a jumper, or electrical terminals accommodated for jumper wires. The charging detection and control circuit further comprises a test switch coupled to the self-diagnostic circuit and configured to manually initiate and terminate either a 30-second test or a 90-minute test of the rechargeable battery. The charging detection and control circuit further comprises at least one status indicator configured to couple to the self-diagnostic circuit. When either the 30-second test or the 90-minute test is manually initiated and when the terminal voltage is examined to be respectively lower than a second predetermined level, the self-diagnostic circuit chooses not to perform respective tests with a status signal sent to the at least one status indicator to show that the rechargeable battery is insufficiently charged for the respective tests.

The self-diagnostic circuit further comprises a non-volatile memory and a data bus connected to the non-volatile memory. At the end of the test duration, a test result of the pass/fail test is serially transmitted via the data bus to the non-volatile memory configured to store attribute data of self-diagnostic test results in multiple pass/fail tests over the test schedules with information of self-diagnostic test times. Both the attribute data of the self-diagnostic test results and the information of the self-diagnostic test times can be serially transferred to a front-end communication circuit when requested. The test and control circuit may comprise a microcontroller, a microchip, a microprocessor, or a programmable logic controller. The self-diagnostic circuit further comprises secondary universal asynchronous receiver and transmitter (UART) ports configured to set up communication links with the front-end communication circuit.

The battery-backup power portion further comprises the front-end communication circuit comprising primary UART ports, a first at least one processor, and a first radio peripheral comprising a first first-in, first-out (FIFO) data buffer and a first serial peripheral interface (SPI). The front-end communication circuit is configured to receive and demodulate various signals generated by spread-spectrum modulation and to exchange the attribute test data and a plurality of commands with the self-diagnostic circuit via the first at least one processor. The first FIFO data buffer is configured to allow the first at least one processor to access the various signals received and the attribute test data to be transmitted via the first SPI. The first at least one processor is configured to output and input UART data respectively to and from the self-diagnostic circuit. The first radio peripheral may be integrated with the first at least one processor, thereby no need of an external RF transceiver. The first FIFO data buffer is also configured to allow the first at least one processor to manage to retransmit the attribute test data in response to a command received. The front-end communication circuit further comprises a first medium access control (MAC) sublayer with a first MAC address configured to identify the front-end communication circuit to a plurality of other front-end communication circuits on a local network. The front-end communication circuit is further configured to support a sleep mode, a periodic sleep mode, and an active mode respectively configured to control different electric current consumptions to save energy of a backup battery. The front-end communication circuit further comprises a plurality of functional input/outputs (IOs) configured to operate the front-end communication circuit and to identify operational statuses. The plurality of functional IOs comprise at least one first IO configured to control a switching between a command mode and a data communication mode. The plurality of functional IOs further comprise at least one second IO configured to control operations of the front-end communication circuit. When the at least one second IO is at a logic-high level, the first at least one processor is prohibited to output and input the UART data respectively to and from the self-diagnostic circuit whereas the switching between the command mode and the data communication mode is suspended. The plurality of functional IOs further comprise at least one third IO configured to control a data retransmission. When the at least one third IO is at the logic-high level, the first at least one processor is requested to retransmit a data packet.

The LED luminaire may further comprise a data gateway comprising a concentrator communication circuit. The data gateway is configured to send the various signals generated by spread-spectrum modulation to the front-end communication circuit in response to a plurality of signals from a remote user interface coupled to the data gateway. The concentrator communication circuit comprises a second at least one processor and a second radio peripheral comprising a second FIFO data buffer and a second SPI. The concentrator communication circuit is configured to convert the plurality of signals into a plurality of sets of binary data characters whereas each of the plurality of sets of binary data characters comprises command data. The concentrator communication circuit is also configured to exchange the command data and the attribute test data with the front-end communication circuit whereas the front-end communication circuit is also configured to send the attribute test data to the concentrator communication circuit as soon as the rechargeable battery test has been performed with the attribute test data available. The concentrator communication circuit further comprises a second MAC sublayer with a second MAC address configured to identify the concentrator communication circuit to a plurality of front-end communication circuits on a local network and to a plurality of other concentrator communication circuits on different local networks. The concentrator communication circuit is further configured to operate in a data communication mode with a transmission of a plurality of data packets whereas the plurality of data packets are allowed to transmit between the front-end communication circuit and the concentrator communication circuit regardless of a frame format of the plurality of data packets.

The data gateway further comprises an antenna transceiver configured to provide an one-to-many connection from a single location of the antenna transceiver to multiple locations of a plurality of front-end communication circuits whereas the antenna transceiver is also configured to collect the attribute test data and to forward the command data respectively from and to the plurality of front-end communication circuits. The data gateway further comprises at least one hypertext transfer protocol (HTTP) communication port coupled to a HTTP application server configured to perform data communication with the data gateway whereas a plurality of application-specific documents are exchanged between the remote user interface and the HTTP application server. The data gateway further comprises at least one wide-area network (WAN) communication port coupled to a data router configured to perform data communication with the data gateway whereas a plurality of application-specific documents are exchanged between the remote user interface and the data router. The HTTP application server comprises a database whereas the remote user interface can access the database to acquire the attribute test data upstream and to issue commands downstream respectively from and to the plurality of front-end communication circuits via the HTTP application server.

In this disclosure, the battery-backup power portion is integrated into the LED luminaire with the self-diagnostic circuit to auto-test charging and discharging current of a rechargeable battery with self-diagnostic test results displayed in a status indicator, supporting dual mode operations of the LED luminaire to work not only in a normal mode but also in an emergency mode. However, as mentioned above, the self-diagnostic test results may be stored in the self-diagnostic circuit, queuing for transmitting to the front-end communication circuit. Furthermore, the self-diagnostic test results may be transmitted to a data gateway to be recorded for further reviews when requested. It is especially essential when many LED luminaires with the battery-backup power portion are widely deployed in a field, and when numerous streaming data are transmitted to the data gateway. Although being likely integrated in the LED luminaire, the battery-backup power portion may be attached to the power supply portion to sustain lighting up the one or more LED arrays at a fraction of the full power when the line voltage from the AC mains is unavailable.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified. Moreover, in the section of detailed description of the invention, any of a "main", a "primary", a "secondary", a "first", a "second", a "third", and so forth does not necessarily represent a part that is mentioned in an ordinal manner, but a particular one.

DETAILED DESCRIPTION OF THE INVENTION

Figure 1:
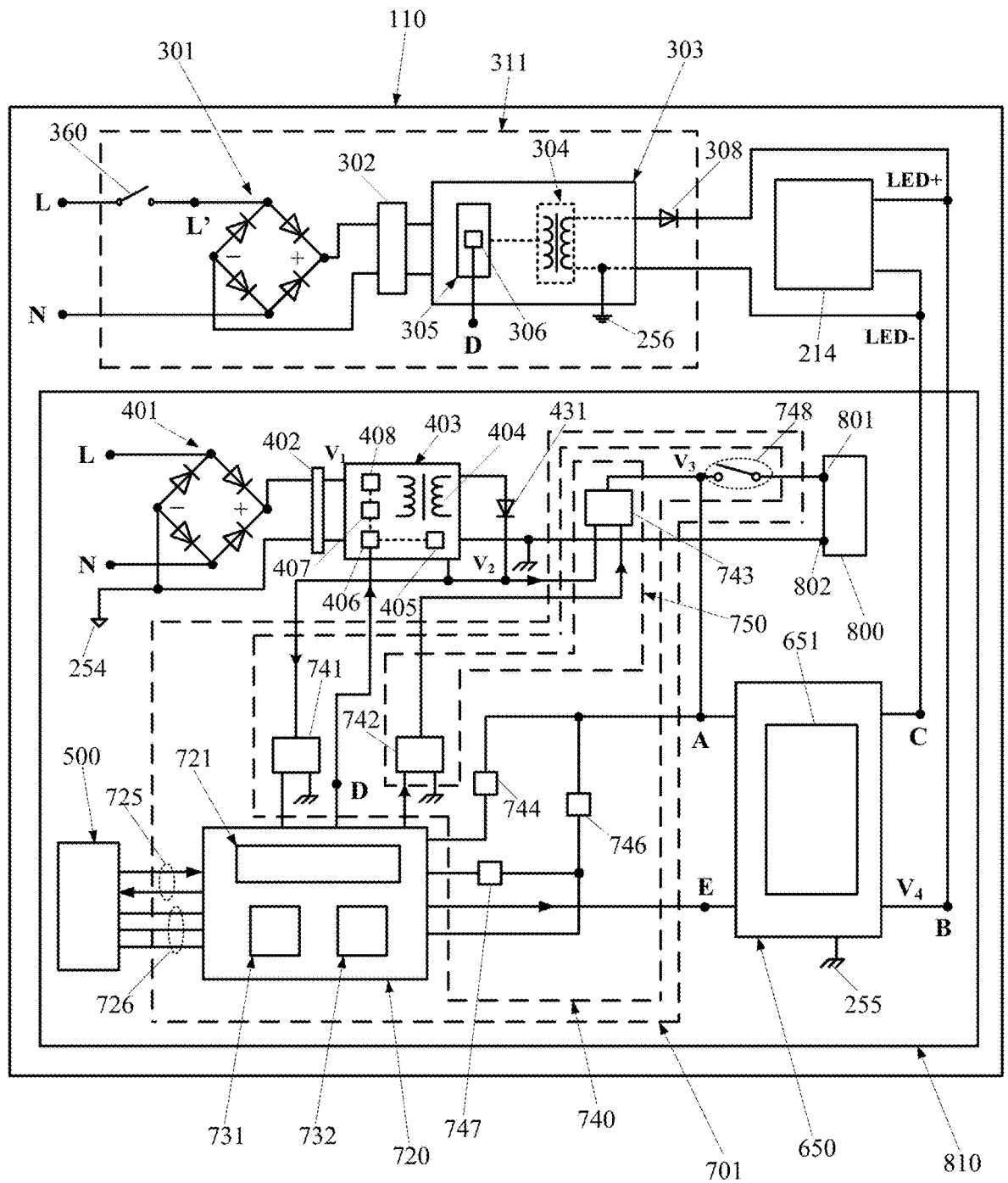
FIG. 1 is a block diagram of an LED luminaire according to the present disclosure.

FIG. 1 is a block diagram of an LED luminaire according to the present disclosure. An LED luminaire 110 is used to replace a fluorescent or an LED luminaire normally operated with the AC mains in a normal mode. In FIG. 1, the LED luminaire 110 comprises a battery-backup power portion 810, one or more LED arrays 214 with a forward voltage across thereof, and a power supply portion 311 that powers the one or more LED arrays 214 when the line voltage from the AC mains is available. The battery-backup power portion 810 comprises an LED driving circuit 650 configured to provide an emergency power (a voltage and a current) to drive the one or more LED arrays 214 when the line voltage from the AC mains is unavailable. The power supply portion 311 originally designed to receive the line voltage from the AC mains for general lighting applications is configured to operate in the normal mode. The power supply portion 311 comprises at least two electrical conductors "L" and "N", a main full-wave rectifier 301, and an input filter 302. The at least two electrical conductors "L" and "N" are configured to couple to "L" and "N" via a power switch 360. The main full-wave rectifier 301 is configured to convert the line voltage from the AC mains into a primary DC voltage. In other words, the at least two electrical conductors "U" and "N" are coupled to a switched power, in which the power supply portion 311 can be turned off when the LED luminaire 110 is not in use during nighttime. The input filter 302 is configured to suppress electromagnetic interference (EMI) noises. The power supply portion 311 further comprises a power switching converter 303 comprising a main transformer 304 and a power factor correction (PFC) and power switching circuit 305. The PFC and power switching circuit 305 is coupled to the main full-wave rectifier 301 via the input filter 302 and configured to improve a power factor and to allow the power switching converter 303 to convert the primary DC voltage into a main DC voltage. The main DC voltage is configured to couple to the one or more LED arrays 214 to operate thereon. The main transformer 304 comprises a third ground reference 256, electrically isolated from a negative (−) port of the main full-wave rectifier 301. The one or more LED arrays 214 comprises a first terminal LED+ and a second terminal LED-configured to receive an LED driving current from the first terminal LED+ and to return from the second terminal LED- to either the LED driving circuit 650 or the power supply portion 311, depending on which one is a source of the LED driving current. The power switching converter 303 is a current source configured to provide the first LED driving current to the one or more LED arrays 214 to operate thereon. The PFC and power switching circuit 305 comprises a main control device 306 configured to receive a pull-down signal via a port "D" to disable the PFC and power switching circuit 305 so that the power switching converter 303 ceases to provide the first LED driving current to drive the one or more LED arrays 214 when a rechargeable battery test is initiated.

In FIG. 1, the battery-backup power portion 810 further comprises the at least two electrical conductors "L" and "N" configured to couple to the AC mains, a rechargeable battery 800, at least one full-wave rectifier 401, at least one input filter 402 coupled to the at least one full-wave rectifier 401, a charging circuit 403, and a control and test circuit 701. The at least one full-wave rectifier 401 is coupled to the at least two electrical conductors "L" and "N" and configured to convert the line voltage from the AC mains into a first DC voltage. The at least one input filter 402 is configured to suppress EMI noises. The rechargeable battery 800 comprises a high-potential electrode 801 and a low-potential electrode 802 with a terminal voltage across thereon. The charging circuit 403 is an isolated step-down converter and comprises a first ground reference 254, a second ground reference 255 electrically isolated from the first ground reference 254, a first transformer 404, a feedback control circuit 405, a charging control device 406, a first electronic switch 407, and a diode 408. The charging circuit 403 is coupled to the at least one full-wave rectifier 401 via the input filter 402 and configured to convert the first DC voltage into a second DC voltage that charges the terminal voltage of the rechargeable battery 800 to reach a nominal third DC voltage. Please note that the terminal voltage of the rechargeable battery 800 may be slightly less than the nominal third DC voltage because the rechargeable battery 800 ages or an ambient temperature is below an optimum operating temperature. When the rechargeable battery 800 badly ages or goes wrong, the terminal voltage may be far from the nominal third DC voltage. That is why the rechargeable battery test is needed to verify that the rechargeable battery 800 is working all the time. The feedback control circuit 405 is configured to monitor the second DC voltage ($V_2$) via a diode 431 and to regulate the charging control device 406 according to charging voltage and current requirements. The first transformer 404 comprises a primary winding coupled to the first ground reference 254 and a secondary winding coupled to the second ground reference 255. The first transformer 404 is configured to provide electrical isolation between the AC mains and the second DC voltage with respect to the second ground reference 255. In FIG. 1, the second ground reference 255 is electrically coupled to the low-potential electrode 802 to ease a charging current to flow into the rechargeable battery 800 and to return to the charging circuit 403, completing a power transfer.

In FIG. 1, the control and test circuit 701 further comprises a self-diagnostic circuit 720 and a charging detection and control circuit 740. The control and test circuit 701 is configured to either enable or disable the LED driving circuit 650 via a port denoted as "E" according to availability of the AC mains and whether a rechargeable battery test is initiated. The charging detection and control circuit 740 comprises a first transistor circuit 741 configured to detect a charging voltage (i.e. the second DC voltage) generated from the charging circuit 403. In FIG. 1, the battery-backup power portion 810 further comprises a front-end communication circuit 500 configured to receive and demodulate various signals generated by spread-spectrum modulation and to exchange attribute test data and a plurality of commands with the self-diagnostic circuit 720. In FIG. 1, the self-diagnostic circuit 720 comprises a test and control circuit 721, a plurality of timers 731, and a non-volatile memory 732, in which the test and control circuit 721 is configured to examine the terminal voltage and to control charging and discharging of the rechargeable battery 800.

In FIG. 1, the charging detection and control circuit 740 further comprises a voltage regulator 746 configured to adjust the nominal third DC voltage or the terminal voltage of the rechargeable battery 800 to an operating voltage of the self-diagnostic circuit 720 to operate thereof. The self-diagnostic circuit 720 is configured to initiate the rechargeable battery test according to predetermined test schedules provided by a plurality of timers 731. The charging detection and control circuit 740 further comprises a peripheral circuit 744. The peripheral circuit 744 is configured to sample a fraction of the terminal voltage of the rechargeable battery 800 and to deliver to the self-diagnostic circuit 720 to examine over a duration of the test period when the rechargeable battery test is initiated. In other words, the self-diagnostic circuit 720 is configured to examine the terminal voltage of the rechargeable battery 800 and to perform a pass/fail test. When the terminal voltage drops below a predetermined level over the duration of the test period, the self-diagnostic circuit 720 assesses the rechargeable battery test as a "failure", a "no-go", a "no", or a "1", a part of the attribute data.

In FIG. 1, the self-diagnostic circuit 720 is also configured to receive a pull-up signal from the first transistor circuit 741 and to send a first control signal via the port "D" to the charging control device 406 to inactivate the charging circuit 403 when the rechargeable battery test is initiated. Note that the first control signal is also sent to the main control device 306 via the port "D" to inactivate the power switching converter 303 when the rechargeable battery test is initiated. The charging detection and control circuit 740 is coupled between the charging circuit 403 and the rechargeable battery 800 and controlled by the self-diagnostic circuit 720. When the first transistor circuit 741 detects the charging voltage, a pull-down signal is sent to the self-diagnostic circuit 720 to enable a normal charging process. The charging detection and control circuit 740 further comprises a charging control circuit 750 comprising a second transistor circuit 742 and a metal-oxide-semiconductor field-effect transistor (MOSFET) 743. The charging control circuit 750 is configured to either allow or prohibit a charging current to flow into the rechargeable battery 800 according to availability of the AC mains. The charging control circuit 750 prohibits the charging current to flow into the rechargeable battery 800 when the rechargeable battery test is initiated. The second transistor circuit 742 is configured to receive a high-level signal equal to a nominal operating voltage of the self-diagnostic circuit 720 therefrom to pull down a bias voltage of the MOSFET 743, thereby disconnecting the charging current when the rechargeable battery test is initiated.

In FIG. 1, the charging detection and control circuit 740 further comprises at least one pair of electrical contacts 748 configured to electrically couple the rechargeable battery 800 to the charging circuit 403, the LED driving circuit 650, and the self-diagnostic circuit 720 when the at least one pair of electrical contacts 748 are connected. When the rechargeable battery test is initiated or when the line voltage from the AC mains is unavailable, power from the rechargeable battery 800 can operate both the LED driving circuit 650 and the self-diagnostic circuit 720. On the other hand, when disconnected, the at least one pair of electrical contacts 748 can safely prevent the rechargeable battery 800 from being drained. The at least one pair of electrical contacts 748 comprise electrical contacts in a switch, a relay, and a jumper, or electrical terminals accommodated for jumper wires. In FIG. 1, the charging detection and control circuit 740 further comprises at least one status indicator 747 controlled by the self-diagnostic circuit 720 and configured to show self-diagnostic test results with various codes.

In FIG. 1, the power supply portion 311 further comprises a first current blocking diode 308 coupled between the power switching converter 303 and the one or more LED arrays 214. The first current blocking diode 308 is configured to couple to the one or more LED arrays 214 to prevent the second LED driving current provided by the LED driving circuit 650 from flowing in, avoiding crosstalk. Similarly, the LED driving circuit 650 may further comprise a second current blocking diode (not shown) configured to couple to the one or more LED arrays 214 to prevent the first LED driving current provided by the power supply portion 311 from flowing in, avoiding crosstalk.

In FIG. 1, the test and control circuit 721 may comprise a microcontroller, a microchip, a microprocessor, or a programmable logic controller. In this disclosure, the battery-backup power portion 810 is depicted to be integrated into the LED luminaire 110 with the self-diagnostic circuit 720 to auto-test charging and discharging current of a rechargeable battery 800 with self-diagnostic test results displayed in a status indicator, supporting dual mode operations of the LED luminaire 110 to work not only in a normal mode but also in an emergency mode. As mentioned above, the self-diagnostic test results may be stored in the self-diagnostic circuit 720, queuing for transmitting to the front-end communication circuit 500. Furthermore, the self-diagnostic test results may be transmitted to a data gateway to be recorded. It is especially important when many of the LED luminaire 110 with the battery-backup power portion 810 are widely deployed in a field covering many buildings. Although being integrated in the LED luminaire 110 in FIG. 1, the battery-backup power portion 810 may be attached to the power supply portion 311 to sustain lighting up the one or more LED arrays 214 at a fraction of the full power when the line voltage from the AC mains is unavailable. In FIG. 1, the LED driving circuit 650 comprises a step-up converter 651 configured to boost the terminal voltage into a fourth DC voltage at a port "B" with respect to the second ground reference 255 and to provide the second LED driving current. The step-up converter 651 is configured to couple to the terminal voltage (i.e. the nominal third DC voltage, $V_3$) via a port denoted as "A" from the rechargeable battery 800. The LED driving circuit 650 further comprises the port "E" to receive an "enable" signal from the self-diagnostic circuit 720 to activate the LED driving circuit 650 when the line voltage from the AC mains is unavailable or when the rechargeable battery test is initiated. The fourth DC voltage is greater than an intrinsic forward voltage of the one or more LED arrays 214 to ensure operating the one or more LED arrays 214 without failure when the line voltage from the AC mains is unavailable. In other words, the LED driving circuit 650 is configured to receive the terminal voltage from the rechargeable battery 800 and to convert the terminal voltage into the fourth DC voltage with the second LED driving current to power up the one or more LED arrays 214 when the line voltage from the AC mains is unavailable. On the other hand, the power supply portion 311 is configured to generate the main DC voltage with the first LED driving current to power up the one or more LED arrays 214 at full power and to meet LED luminaire efficacy requirements when the line voltage from the AC mains is available.

Figure 2:
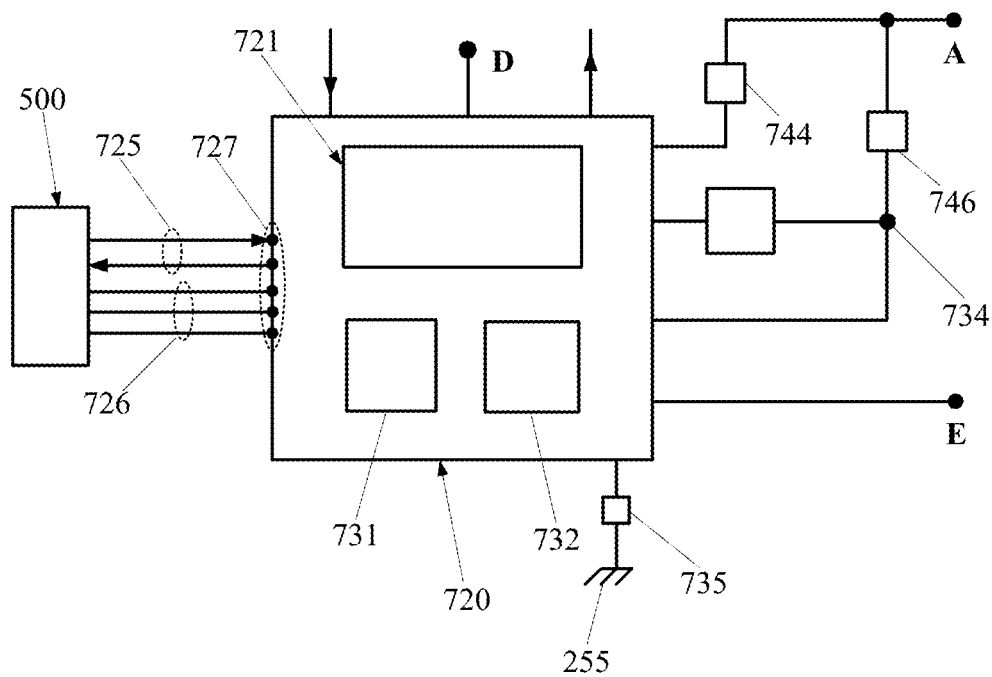
FIG. 2 is a block diagram of a self-diagnostic circuit according to the present disclosure.

FIG. 2 is a block diagram of a self-diagnostic circuit according to the present disclosure. As depicted in FIG. 1, the self-diagnostic circuit 720 comprises the plurality of timers 731, the test and control circuit 721, and the non-volatile memory 732. The self-diagnostic circuit 720 is configured to initiate the rechargeable battery test according to predetermined test schedules provided by the plurality of timers 731. In FIG. 2, the self-diagnostic circuit 720 further comprises a universal asynchronous receiver and transmitter (UART) data bus 725, a control bus 726, and secondary UART ports 727. The UART data bus 725 and the control bus 726 are coupled to the front-end communication circuit 500 via the secondary UART ports 727 and are configured to receive and demodulate various signals generated by spread-spectrum modulation and to exchange the attribute test data and a plurality of commands with the self-diagnostic circuit 720. The UART data bus 725 comprises a receiving link and a transmitting link whereas the control bus 726 comprises a mode port, a busy port, and an acknowledge port, respectively controlling the UART data bus 725 to transmit and receive data and to switch between a command mode and a data communication mode (see FIG. 4 for details). At an end of each test period, a test result of the pass/fail test is serially transmitted to the non-volatile memory 732. The non-volatile memory 732 is configured to store the attribute data of self-diagnostic test results in multiple pass/fail tests over the predetermined test schedules with information of self-diagnostic test times such as a year, a month, and a day in a calendar. Both the attribute data of the self-diagnostic test results and the information of the self-diagnostic test times are serially transferred to the front-end communication circuit 500 when requested. As depicted in FIG. 1, the voltage regulator 746 is configured to adjust the nominal third DC voltage or the terminal voltage of the rechargeable battery 800 to an operating voltage of the self-diagnostic circuit 720 as a primary power supply 734. A backup power supply 735 uses a small battery as a backup supply.

Figure 3:
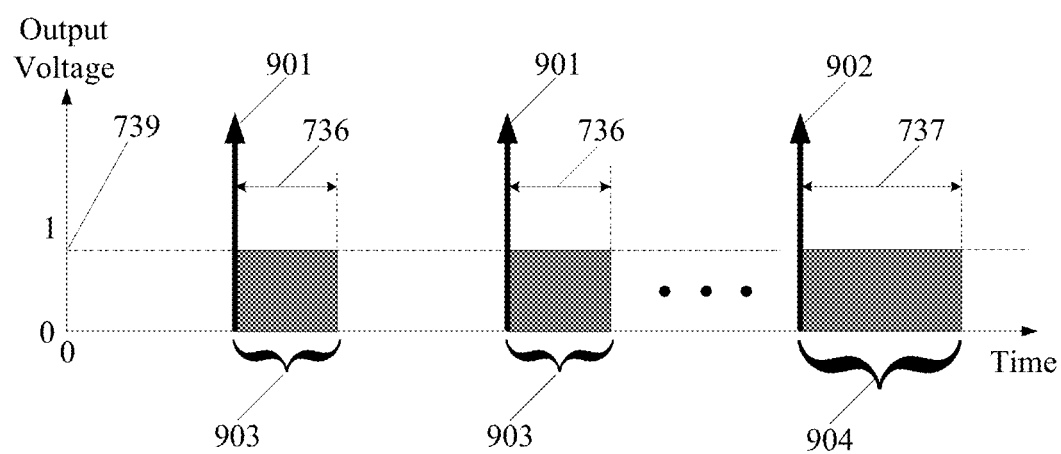
FIG. 3 is a timing diagram of a self-diagnostic circuit according to the present disclosure.

FIG. 3 is a timing diagram of the self-diagnostic circuit 720 according to the present disclosure. The self-diagnostic circuit 720 is configured to initiate the rechargeable battery test according to predetermined test schedules provided by the plurality of timers 731. Each of the predetermined test schedules comprises a test period immediately following an initiation of a test event. Upon the initiation of the test event, such as a first kind of an initiation 901 and a second kind of an initiation 902, the test period begins with an output 739 of the self-diagnostic circuit 720 activated to reach a logic-high level (i.e. "1" state) and remaining activated so as to enable the LED driving circuit 650 and the test and control circuit 721. At an end of the test period, the output 739 of the self-diagnostic circuit 720 is inactivated to drop to a logic-low level (i.e. "0" state). A duration of the test period is configured to allow the self-diagnostic circuit 720 to control discharging of the rechargeable battery 800 and to perform the rechargeable battery test. Specifically, the plurality of timers 731 start with a reset. The predetermined test schedules comprise a first kind of the test event 903 and a second kind of the test event 904 respectively at an end of each month and at an end of each year after the reset. In other words, from time "0" to the first kind of the test event 903 is at least one first time delay followed by at least one second time delay during which a test is performed. That is, the at least one first time delay is a wait period whereas the at least one second time delay is a test period. The reset is needed when the LED luminaire 110 is first installed. The first kind of the test event 903 and a second kind of the test event respectively comprise a test period 736 and a test period 737, which respectively comprise a nominal duration of 30 seconds and 90 minutes. In FIG. 3, the output 739 shown comprises two states "0" and "1", in which "0" means no voltage appeared or being inactivated at the output 739 of the self-diagnostic circuit 720 whereas "1" means that the output 739 of the self-diagnostic circuit 720 provides a high-level output voltage or is activated. In other words, the self-diagnostic circuit 720 sends the high-level output voltage to enable the LED driving circuit 650 via the port "E" during the test period 736 or 737.

Figure 4:
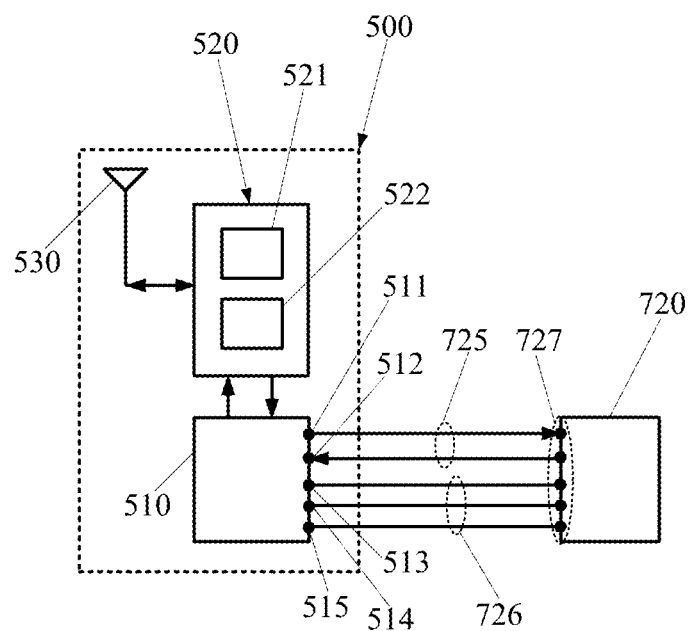
FIG. 4 is a block diagram of a front-end communication circuit according to the present disclosure.

FIG. 4 is a block diagram of a front-end communication circuit according to the present disclosure. The front-end communication circuit 500, served as a node or one of network devices in a local network, comprises primary UART ports 511-515, a first at least one processor 510, and a first radio peripheral 520 comprising a first first-in, first-out (FIFO) data buffer 521 and a first serial peripheral interface (SPI) 522. The first FIFO data buffer 521 is configured to allow the first at least one processor 510 to access the various signals received and the attribute test data to be transmitted via the first SPI 522. The first at least one processor 510 is configured to output and input UART data respectively to and from the self-diagnostic circuit 720. The first radio peripheral 520 is configured to either demodulate received signals generated by spread-spectrum modulation and to exchange the attribute test data and a plurality of commands with the self-diagnostic circuit 720 via the first at least one processor or modulate the attribute data into spread-spectrum modulated signals. When requested, the self-diagnostic circuit 720 may transmit the self-diagnostic test results and the information of the self-diagnostic test times to the front-end communication circuit 500 with transmitted data buffered. The front-end communication circuit 500 may further comprise an antenna 530. The primary UART ports 511-515 correspond to the UART data bus 725 and the control bus 726 (already mentioned in FIG. 2) and are coupled to the self-diagnostic circuit 720 at the secondary UART ports configured to set up communication links with the front-end communication circuit 500 and to exchange UART data. The front-end communication circuit 500 is configured to receive and demodulate various signals generated by spread-spectrum modulation and to exchange the attribute test data and the plurality of commands with the self-diagnostic circuit 720. The UART data bus 725 may comprise a transmitting link connecting to the port 511 and a receiving link connecting to the port 512. The control bus 726 comprises a mode selection link connecting to the port 513, a busy indicator link connecting to the port 514, and an acknowledge link connecting to the port 515, respectively controlling the UART data bus 725 to transmit and receive data and to switch between the command mode and the data communication mode.

In FIG. 4, the front-end communication circuit 500 further comprises a plurality of functional input/outputs (IOs) configured to operate the front-end communication circuit 500 and to identify operational statuses to control the front-end communication circuit 500. The plurality of functional IOs may further comprise at least one first IO corresponding to a function of the mode selection link. The at least one first IO is configured to control a switching between the command mode and the data communication mode. Specifically, when the least one first IO is at a logic-high level, the front-end communication circuit 500 is in the data communication mode, whereas, when the least one first IO is in a logic-low level, the front-end communication circuit 500 is in the command mode. The plurality of functional IOs may further comprise at least one second IO, corresponding to a function of the busy indicator link, configured to control operations of the front-end communication circuit 500. When the least one second IO is at the logic-high level, meaning "busy", the first at least one processor 510 is prohibited to output and input the UART data respectively to and from the self-diagnostic circuit 720 whereas the switching between the command mode and the data communication mode is suspended. The plurality of functional IOs further comprise at least one third IO, corresponding to a function of the acknowledge link, configured to control a data retransmission. When the at least one third IO is at the logic-high level, the first at least one processor is requested to retransmit a data packet because a previous transmission of the data packet is not successful. The first radio peripheral 520 may be integrated with the first at least one processor 510, thereby no need of an external RF transceiver. In FIG. 4, the first FIFO data buffer 521 is also configured to allow the first at least one processor 510 to manage to retransmit the attribute test data in response to a command received. The front-end communication circuit 500 may further comprise a first medium access control (MAC) sublayer in a data link layer with a first MAC address configured to identify the front-end communication circuit 500 to a plurality of other front-end communication circuits on the local network. The first MAC sublayer is a layer that controls the front-end communication circuit 500 responsible for interaction with wireless transmission medium in this disclosure. The MAC sublayer and the logical link control sublayer together make up the data link layer.

Figure 5:
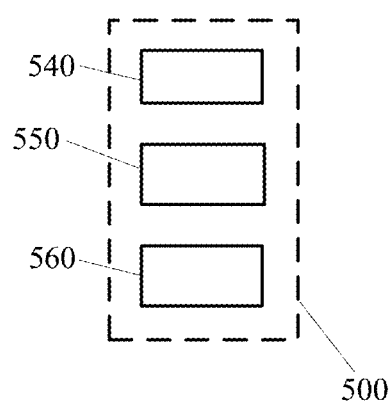
FIG. 5 is operational modes of a front-end communication circuit according to the present disclosure.

FIG. 5 is operational modes of a front-end communication circuit according to the present disclosure. The front-end communication circuit 500 is further configured to support a sleep mode 540, a periodic sleep mode 550, and an active mode 560 respectively configured to control different electric current consumptions to save energy of a backup battery (not shown). Sometimes, the backup battery may be required to sustain a five-year operation without replacement. With the sleep mode 540, the periodic sleep mode 550, and the active mode 560, users can deign to choose different power consumptions in different scenarios to meet such stringent requirements.

Figure 6:
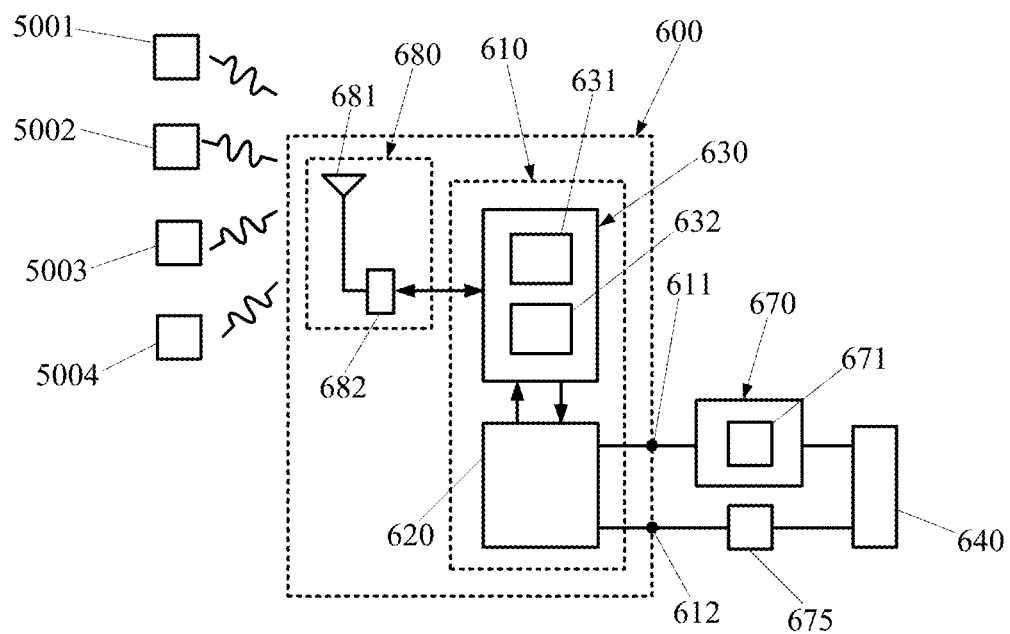
FIG. 6 is a block diagram of a concentrator communication circuit according to the present disclosure.

FIG. 6 is a block diagram of a concentrator communication circuit according to the present disclosure. The LED luminaire 110 further comprises a data gateway 600 comprising a concentrator communication circuit 610. The concentrator communication circuit 610 is configured to exchange the command data and the attribute test data with the front-end communication circuit 500 whereas the front-end communication circuit 500 is also configured to send the attribute test data to the concentrator communication circuit 610 as soon as the rechargeable battery test has been performed with the attribute test data available. The data gateway 600 may further comprise at least one hypertext transfer protocol (HTTP) communication port 611 coupled to a HTTP application server 670 configured to perform data communications with the data gateway 600. A plurality of application-specific documents are exchanged between a remote user interface 640 and the HTTP application server 670. The HTTP application server 670 may comprise a database 671 whereas users can use the remote user interface 640 to access the database 671 to acquire the attribute test data upstream and to issue commands downstream respectively from and to a plurality of front-end communication circuits 5001, 5002, 5003, and 5004, for example, via the HTTP application server 670. The data gateway 600 is configured to send the various signals generated by spread-spectrum modulation to the front-end communication circuit 500 in response to a plurality of signals from the remote user interface 640. The concentrator communication circuit 610 comprises a second at least one processor 620 and a second radio peripheral 630 comprising a second FIFO data buffer 631 and a second SPI 632. The concentrator communication circuit 610 is configured to convert the plurality of signals into a plurality of sets of binary data characters whereas each of the plurality of sets of binary data characters comprises command data. The data gateway 600 may further comprise at least one wide-area network (WAN) communication port 612 coupled to a data router 675 configured to perform data communications with the data gateway 600 whereas a plurality of application-specific documents are exchanged between the remote user interface 640 and the data router 675. The data gateway 600 further comprises an antenna transceiver 680 configured to provide an one-to-many connection from a single location of the antenna transceiver 680 to multiple locations of the plurality of front-end communication circuits 5001, 5002, 5003, and 5004 whereas the antenna transceiver 680 is also configured to collect the attribute test data and to forward the command data respectively from and to the plurality of front-end communication circuits 5001, 5002, 5003, and 5004. The antenna transceiver 680 may comprise an antenna 681 and an impedance match network 682. The concentrator communication circuit 610 is further configured to operate in the data communication mode with a transmission of a plurality of data packets. Each of the plurality of data packets may comprise a header followed by a payload as a frame format in a simplest form. The header may comprise information about the each of the plurality of data packets, such as a source and a destination MAC addresses whereas the payload is actual data. Data communication mode between the front-end communication circuit 500 and the concentrator communication circuit 610 comprise a first kind of data communication with the MAC address and a second kind of data communication without the MAC address. In the former case, a data packet must meet the header and the payload requirement whereas in the latter case, only data are transmitted. The concentrator communication circuit 610 may be further configured to operate in the latter case whereas the plurality of data packets are allowed to transmit between the front-end communication circuit 500 and the concentrator communication circuit 610 regardless of the frame format. The second at least one processor 620 may comprise a microcontroller, a microchip, or a programmable logic controller, which may comprise a network-compliant MAC and protocol-stack consumer software solutions. The concentrator communication circuit 610 further comprises a second MAC sublayer with a second MAC address configured to identify the concentrator communication circuit 610 to the plurality of front-end communication circuits 5001, 5002, 5003, and 5004, for example, on a local network and to a plurality of other concentrator communication circuits on different local networks. In FIG. 6, the plurality of front-end communication circuits 5001, 5002, 5003, and 5004 and the data gateway 600 are on the same local network. All of them need their MAC addresses to identify themselves. In practice, the plurality of front-end communication circuits 5001, 5002, 5003, and 5004 will report to the data gateway 600 when they first join the local network, a part of networking processes. The data gateway 600 can manage the local network according to a protocol.

Whereas preferred embodiments of the present disclosure have been shown and described, it will be realized that alterations, modifications, and improvements may be made thereto without departing from the scope of the following claims. Another kind of schemes with a battery-backup power portion operated by using timers, a test and control circuit, a plurality of front-end communication circuits, and at least one concentrator communication circuit, and various kinds of combinations to accomplish the same or different objectives could be easily adapted for use from the present disclosure. Accordingly, the foregoing descriptions and attached drawings are by way of example only and are not intended to be limiting.

What is claimed is:

1. A light-emitting diode (LED) luminaire, comprising:
one or more LED arrays;
a power supply portion configured to generate a main direct-current (DC) voltage with a first LED driving current to power up the one or more LED arrays when a line voltage from alternate-current (AC) mains is available; and
a battery-backup power portion, comprising:
a rechargeable battery with a terminal voltage across thereon;
at least one full-wave rectifier configured to convert the line voltage into a first DC voltage;
a charging circuit comprising a charging control device and a first transformer, the charging circuit coupled to the at least one full-wave rectifier and configured to convert the first DC voltage into a second DC voltage that charges the terminal voltage of the rechargeable battery to reach a nominal third DC voltage;
an LED driving circuit comprising a step-up converter configured to up-convert the terminal voltage from the rechargeable battery into a fourth DC voltage with a second LED driving current to power the one or more LED arrays when the line voltage from the AC mains is unavailable;
a control and test circuit comprising a self-diagnostic circuit and a charging detection and control circuit, the control and test circuit configured to either enable or disable the LED driving circuit and the power supply portion according to availability of the AC mains and whether a rechargeable battery test is initiated; and
a front-end communication circuit comprising primary universal asynchronous receiver and transmitter (UART) ports, a first at least one processor, and a first radio peripheral comprising a first first-in, first-out (FIFO) data buffer and a first serial peripheral interface (SPI), the front-end communication circuit configured to receive and demodulate various signals generated by spread-spectrum modulation and to exchange attribute test data and a plurality of commands with the self-diagnostic circuit via the first at least one processor and the primary UART ports,
wherein:
the charging circuit, the LED driving circuit, the power supply portion, and the control and test circuit are configured to auto-select either the main DC voltage or the fourth DC voltage to operate the one or more LED arrays;
the self-diagnostic circuit comprises a plurality of timers configured to set up test schedules and to allow the self-diagnostic circuit to control discharging of the rechargeable battery and to perform the rechargeable battery test according to the test schedules;
the self-diagnostic circuit further comprises secondary UART ports configured to set up communication links with the front-end communication circuit;
the first FIFO data buffer is configured to allow the first at least one processor to access the various signals received and the attribute test data to be transmitted via the first SPI; and
the first at least one processor is configured to output and input UART data respectively to and from the self-diagnostic circuit.

2. The light-emitting diode (LED) luminaire of claim 1, wherein the first radio peripheral is integrated with the first at least one processor, thereby no need of an external RF transceiver.

3. The light-emitting diode (LED) luminaire of claim 1, wherein the first FIFO data buffer is also configured to allow the first at least one processor to retransmit the attribute test data in response to a command received.

4. The light-emitting diode (LED) luminaire of claim 1, wherein the front-end communication circuit further comprises a first medium access control (MAC) sublayer with a first MAC address configured to identify the front-end communication circuit to a plurality of other front-end communication circuits on a local network.

5. The light-emitting diode (LED) luminaire of claim 1, wherein the test schedules comprise at least one first time delay and at least one second time delay, wherein the at least one first time delay comprises a nominal wait duration of 30 days, and wherein the at least one second time delay comprises a nominal test duration of either 90 minutes or 30 seconds.

6. The light-emitting diode (LED) luminaire of claim 5, wherein the charging detection and control circuit further comprises a peripheral circuit configured to sample and deliver a fraction of the terminal voltage on the rechargeable battery to the self-diagnostic circuit to examine over a duration of the at least one second time delay when the rechargeable battery test is initiated by the test schedules.

7. The light-emitting diode (LED) luminaire of claim 6, wherein the self-diagnostic circuit is configured to perform a pass/fail test, and wherein, when the terminal voltage drops below a predetermined level over the duration of the at least one second time delay, the self-diagnostic circuit assesses a failure for the rechargeable battery test.

8. The light-emitting diode (LED) luminaire of claim 1, wherein the front-end communication circuit is further configured to support a sleep mode, a periodic sleep mode, and an active mode respectively configured to control different electric current consumptions to save energy of a backup battery used to sustain operations of the front-end communication circuit.

9. The light-emitting diode (LED) luminaire of claim 1, wherein the front-end communication circuit further comprises a plurality of functional input/outputs (IOs) configured to identify operational statuses and to operate and to control the front-end communication circuit.

10. The light-emitting diode (LED) luminaire of claim 9, wherein the plurality of functional IOs comprise at least one first IO configured to control a switching between a command mode and a data communication mode, and wherein, when the at least one first IO is at a logic-high level, the front-end communication circuit is in the data communication mode.

11. The light-emitting diode (LED) luminaire of claim 10, wherein the plurality of functional IOs further comprise at least one second IO configured to control operations of the front-end communication circuit, and wherein, when the at least one second IO is at the logic-high level, the first at least one processor is prohibited to output and input the UART data respectively to and from the self-diagnostic circuit whereas the switching between the command mode and the data communication mode is suspended.

12. The light-emitting diode (LED) luminaire of claim 11, wherein the plurality of functional IOs further comprise at least one third IO configured to control a data retransmission, and wherein, when the at least one third IO is at the logic-high level, the first at least one processor is requested to retransmit a data packet because a previous transmission of the data packet is not successful.

13. The light-emitting diode (LED) luminaire of claim 1, further comprising:
a data gateway comprising a concentrator communication circuit, the data gateway configured to send the various signals generated by spread-spectrum modulation to the front-end communication circuit in response to a plurality of signals from a remote user interface coupled to the data gateway, wherein the concentrator communication circuit comprises a second at least one processor and a second radio peripheral comprising a second FIFO data buffer and a second SPI, wherein the concentrator communication circuit is configured to convert the plurality of signals into a plurality of sets of binary data characters, and wherein each of the plurality of sets of binary data characters comprises command data.

14. The light-emitting diode (LED) luminaire of claim 13, wherein the concentrator communication circuit is also configured to exchange the command data and the attribute test data with the front-end communication circuit, and wherein the front-end communication circuit is also configured to send the attribute test data to the concentrator communication circuit as soon as the rechargeable battery test has been performed with the attribute test data available.

15. The light-emitting diode (LED) luminaire of claim 14, wherein the concentrator communication circuit further comprises a second medium access control (MAC) sublayer with a second MAC address configured to identify the concentrator communication circuit to a plurality of front-end communication circuits on a local network and to a plurality of other concentrator communication circuits on different local networks.

16. The light-emitting diode (LED) luminaire of claim 15, wherein the concentrator communication circuit is further configured to operate in a data communication mode without the MAC address, and wherein a plurality of data packets are allowed to transmit between the front-end communication circuit and the concentrator communication circuit regardless of a frame format of each of the plurality of data packets.

17. The light-emitting diode (LED) luminaire of claim 14, wherein the data gateway further comprises an antenna transceiver configured to provide an one-to-many connection from a single location of the antenna transceiver to multiple locations of the plurality of front-end communication circuits, and wherein the antenna transceiver is also configured to collect the attribute test data and to forward the command data respectively from and to the plurality of front-end communication circuits.

18. The light-emitting diode (LED) luminaire of claim 13, wherein the data gateway further comprises at least one hypertext transfer protocol (HTTP) communication port coupled to a HTTP application server configured to perform data communications with the data gateway, and wherein a plurality of application-specific documents are exchanged between the remote user interface and the HTTP application server.

19. The light-emitting diode (LED) luminaire of claim 12, wherein the data gateway further comprises at least one wide-area network (WAN) communication port coupled to a data router configured to perform data communications with the data gateway, and wherein a plurality of application-specific documents are exchanged between the remote user interface and the data router.

20. The light-emitting diode (LED) luminaire of claim 17, wherein the HTTP application server comprises a database, and wherein the remote user interface can access the database to acquire the attribute test data upstream and to issue commands downstream respectively from and to a plurality of front-end communication circuits via the HTTP application server.

* * * * *